United States Patent [19]

Dupuis

[11] 4,207,651
[45] Jun. 17, 1980

[54] SWIVEL CASTER HAVING THREAD PROTECTION

[76] Inventor: Leo Dupuis, 67 Longedge Ave., Fitchburg, Mass. 01420

[21] Appl. No.: 891,557

[22] Filed: Mar. 30, 1978

[51] Int. Cl.² .............................................. B60B 33/00
[52] U.S. Cl. ...................................................... 16/41
[58] Field of Search ............... 16/18 R, 18 A, 18 CG, 16/31 R, 41, 45, 40

[56] References Cited

U.S. PATENT DOCUMENTS

| 2,742,663 | 4/1956 | Meadows | 16/41 |
|---|---|---|---|
| 3,040,371 | 6/1962 | Rice et al. | 16/31 R |
| 3,060,488 | 10/1962 | Skupas et al. | 16/31 R |
| 3,075,232 | 1/1963 | Rice et al. | 16/18 A |
| 3,177,516 | 4/1965 | Price et al. | 16/18 A |
| 3,235,901 | 2/1966 | Rice et al. | 16/18 A |
| 3,928,888 | 12/1975 | Lapham | 16/18 A |
| 3,964,124 | 6/1976 | Crawford | 16/18 CG |

FOREIGN PATENT DOCUMENTS 278881  2/1952  Switzerland ........................... 16/18 A Primary Examiner—George H. Krizmanich
Attorney, Agent, or Firm—Charles R. Fay

[57] ABSTRACT

A swivel caster comprising in general a wheel, a hemispherical die casting having a spindle mounting the wheel, the die casting having an edge closely adjacent to one side of the wheel, and notches formed at the edge of the hemispherical die casting, the edges forming the notches being in planes generally tangent to circles having axes coincident with the axis of the spindle.

In addition a flat cover is provided to isolate rough spots due to die casting.

7 Claims, 5 Drawing Figures

SWIVEL CASTER HAVING THREAD PROTECTION

BACKGROUND OF THE INVENTION

Swivel casters of the class described comprise in general a wheel having a socket thereon centrally thereof for the reception of a spindle mounted centrally and internally of a generally hemispherical die casting or the like, the die casting having tangentially arranged thereon a socket for the reception of a spindle on a bracket adapted to be attached to whatever object it is desired to be moved along the floor.

These swivel casters pick up threads and the like when used for instance industrially in textile operations. In some cases the threads (and lint) have been found to pack in so tightly as to resist rotation of the wheel and in some cases to lock it.

When this happens the swivel caster must be taken apart manually and cleaned if it is to be made useful.

The present invention provides a very simple means allowing the caster to maintain optimum tracking ability and in general solving the problem involved through the pick up of threads, etc.

DISCUSSION OF THE PRIOR ART

The prior art comprises as far as known a single patent which discloses an attempt to solve this problem through the use of a flexible skirt bridging the space between parts that are comparable to the wheel aforesaid herein and the hemispherical die casting as at 43 in United States Patent to Laphan, No. 3,928,888, Dec. 30, 1975, This patent refers to lint and does not mention the more serious problem of picking up threads which wrap around the spindle, but in any event the proposed solution in the identified patent is completely different from that presented herewith.

Other patents which show swivel casters closer to the present general construction include Shepherd U.S. Pat. No. 3,054,135, attention being directed to FIG. 4 therein, which shows the internal construction of the swivel caster which is somewhat similar to that of the present case; and additional patents that might be cited in this regard include three patents to Rice et al, U.S. Pat. Nos. 3,075,231; 3,075,232 and 3,235,901. None of these patents, however, disclose any lint or thread protection.

SUMMARY OF THE INVENTION

In the present case the principal construction of the swivel caster is old and well-known comprising a wheel having a socket receiving a spindle, the spindle being mounted centrally and internally of a generally hemispherical member which is preferably a die casting or the like, with means connecting the wheel and the hemispherical member together. The wheel rotates on the member and the latter has means for attaching the entire swivel caster to the underside of a crate, barrel, basket, or other device that is being adapted to be wheeled along a floor, as for instance, industrially and in textile shops or the like, where a lot of lint and threads etc., are generally picked up by devices of this nature and in many cases made inoperable thereby.

The solution to the problem in the present case includes a series of notches which are formed on the edge of the hemispherical member. There may be one or more notches arranged along the edge of the hemispherical member and in each case these notches are formed by flat edges, said edges being in different planes, but all of the planes for all of the edges for all of the notches being in planes which are tangentially arranged with respect to concentric circles the centers of which lie in the axis of the spindle. These edges also all lie in the direction of rotation of the wheel which is unidirectional.

Long and continued useage of this construction has shown that the novel swivel caster fails to pick up lint or threads in amounts to cause trouble with respect to the roll and free rotation of the wheel, thus maintaining the swivel caster in full and free rolling and tracking ability. The reason for this advantageous action is believed to reside at least in part in the fact that the edges of the notches are rather sharp and also the direction of the various planes in which these edges lie, which as stated are in planes tangential to circles the centers of which coincide with the axis of the spindle, and in addition the fact that all said planes in which said edges are located lie to the same side in parallel, they all generally are directed in the same direction rotationally of the wheel. Also, a flat similar cover attached to the die casting covers certain unwanted projections that are apt to catch threads and cause them to wind on the spindle.

BRIEF DESCRIPTION OF THE FIGURES

FIG. 6 is a view partly in section showing the relationship of the sharp edges of the indentations with reference to strings or the like having found an anchor within the caster.

PREFERRED EMBODIMENT OF THE INVENTION

Figure 1:
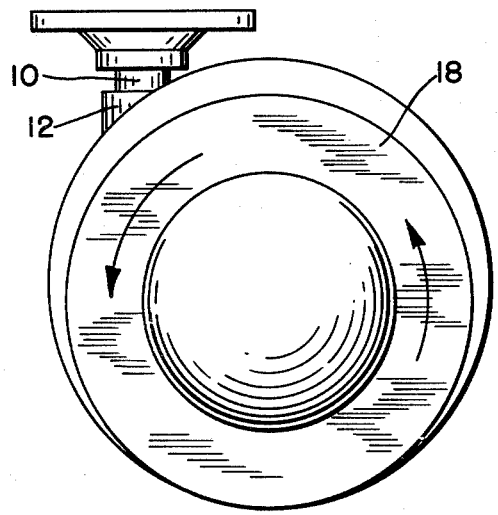
FIG. 1 is a view in elevstion from the wheel side of the swivel caster.
Figure 2:
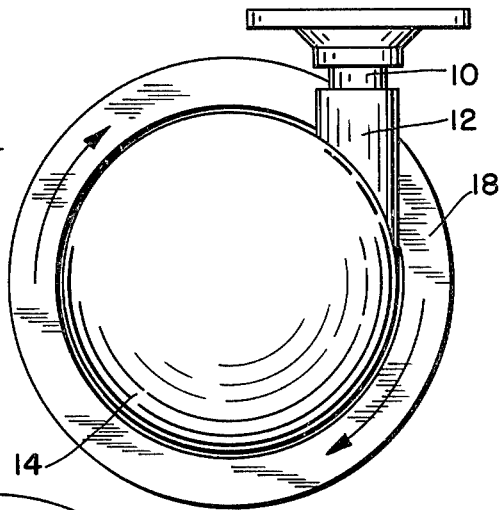
FIG. 2 is a view in elevation from the oposite side thereof.
Figure 5:
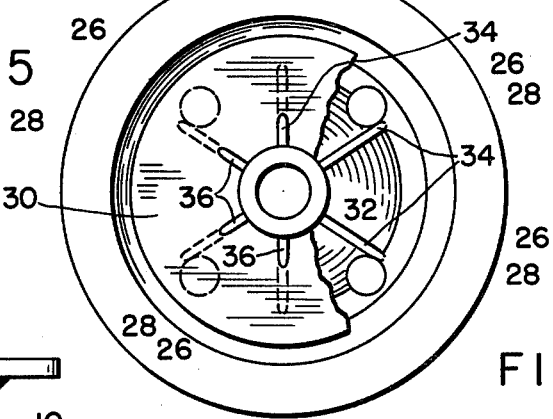
FIG. 5 illustrates the flat cover in the die casting.
Figure 3:
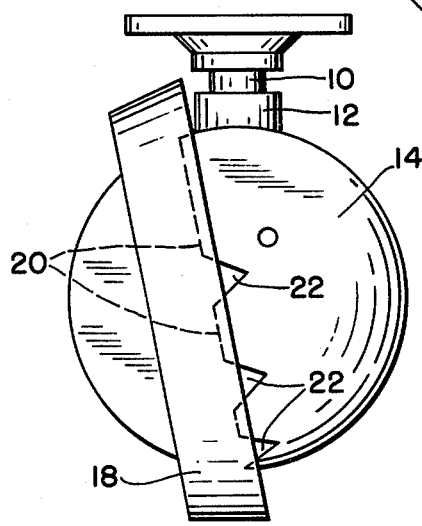
FIG. 3 is a view looking in the direction of arrow 3 in FIG. 2.

An off set post 10 is mounted in a socket 12 formed in a hemispherical member 14, see FIGS. 2 and 3. The member 14 has a spindle 16, this spindle being interior thereof and centrally located and is adapted to connect hemispherical member 14 with respect to the wheel 18 which has a socket for receiving the spindle. This socket is not shown herein but is old and well-known in the art.

The hemispherical member 14 has a circular edge 20 which in some cases actually underlies an under cut portion of the wheel 18 to minimize as much as possible the entrance of detritus, lint, threads and so forth which tend to be picked up by the wheel and transferred into the interior of the hemispherical member to such an extent that at times the swivel becomes impossible to use and the wheel fails to rotate and, of course, the swivel caster fails to properly track. This construction is old and well-known but fails to keep out the threads, etc.

Figure 4:
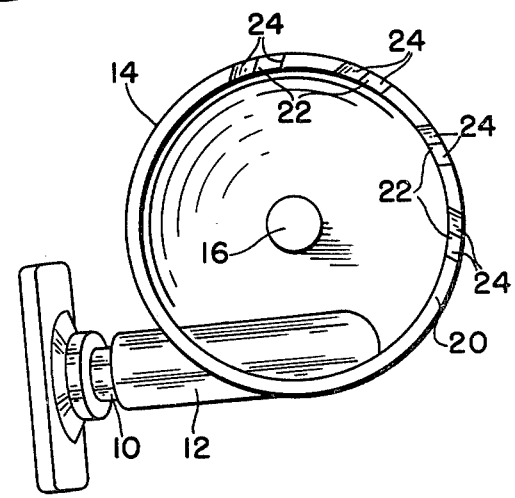
FIG. 4 is a view in elevation illustrating the hemispherical member with the wheel removed.

In the present case, the edge 20 of the hemispherical member 14 is provided with notches generally indicated at 22, each notch comprising at least a pair of side members 24 which are formed or cut into the periphery of the hemispherical member and it will be noted, see FIG. 4, that all of these side edges 24 are located in planes, which extended, are tangential to circles having centers coincident with the axis of the spindle 16.

It has been found that with this construction whether there are one, two, or more of these notches, the entrance of detritus such as threads and so forth into the interior of the hemispherical member is largely obviated. The reason for this action may be that the edges of the notches tend to cut and finally disintegrate the threads and prevent their entry into the hemispherical member.

Another action which has been noted with respect to the swivel caster of the present invention is the fact that the wheel is unidirectional, i.e. the wheel always rotates in the same direction according to the arrows in FIG. 2. The reason for this is that the spindle 10 is off set from the center of the caster so that when the object the caster is attached to is reversed in direction, the tendency is for the entire caster to swivel around 180°, and trail with respect to the directional motion of the object to which the caster or casters is connected.

Some castings have rather sharp projections 26, caused during casting, and located adjacent the sprues 28 and these will catch any threads that do happen to get into the caster and holding the same cause the threads to wrap up around the spindle. A flat washer 30 of any suitable material is snapped into the casting and has a central hole to grip the socket 32 so that it remains in place covering the sprues and projections and preventing any threads from catching. In some cases there are slanted radial ribs 34 and in this case the washer is provided with partial slots at 36 to accommodate the ribs and to allow the covering washer 30 to seat onto the projections while still clearing the socket 12, FIG. 4 on casting 14.

The reference numeral 40 represents a string or thread which may become anchored in some way in the interior of the caster. As shown in FIG. 6 it is wound on the socket 32 and, of course, will be fed into the interior of the caster as long as the string or thread lasts as indicated at 42

However, at some revolution of the caster the string will tend to intersect the sharp edges 24 of the indentations 22 and will be cut off so that the build up inside the caster will be held to a minmum. There may be several volutions of the wheel before the thread aligns itself in the right position, but since the sharp edges 24 underlie the adjacent edges of the wheel as is shown in dotted lines in FIG. 3 and also as shown in FIG. 6 it will be clear that sooner or later the strings or threads are going to have to come into contact with said sharp edges.

I claim:

1. A swivel caster comprising a wheel, a generally hemispherical member attached to and mounting the wheel, the edge of the hemispherical member approaching the wheel closely, means on the hemispherical member for attachment to an object,
    and indentations in the periphery of the hemispherical member at the edge thereof,
    the indentations being provided with side surfaces that are in general tangential to circles having axes generally coincident with the axis of the hemispherical member,
said side surfaces having sharpened edges.

2. The swivel caster of claim 1 wherein said side surfaces are generally flat.

3. The swivel caster of claim 2 wherein said sharp edges are at the periphery of said hemispherical member.

4. The swivel caster of claim 3 wherein the entire swivel caster is offset with relation to the means for attaching the same to an object, thereby providing that the swivel caster wheel is unidirectional 5. The swivel caster of claim 4 wherein the planes in which the side surfaces of the indentations lie extend in the same direction as the rotation of the wheel.

6. The swivel caster of claim 1 including a flat washer interior of the caster and covering accidentally formed projections in the parts of the caster.

7. The swivel caster of claim 6 wherein the washer has a center hole to fit and be secured to a portion of the caster in operative position.

* * * * *